United States Patent [19]
Robbs

[11] Patent Number: 5,617,780
[45] Date of Patent: Apr. 8, 1997

[54] DAYLIGHT REDUCER FOR FOOD CROP STORAGE BUILDING

[76] Inventor: Steven E. Robbs, c/o Industrial Ventilation, Inc. 723 E. Karcher Rd., Nampa, Id. 83687

[21] Appl. No.: 230,131

[22] Filed: Apr. 20, 1994

[51] Int. Cl.⁶ .............................. A01J 11/04; G02B 27/00
[52] U.S. Cl. ................................................ 99/467; 359/596
[58] Field of Search .............................. 359/599, 592, 359/591, 595, 596, 597, 615; 52/808; 99/467, 476, 475; 428/118, 116

[56] References Cited

U.S. PATENT DOCUMENTS

| | | | |
|---|---|---|---|
| 2,325,003 | 7/1943 | Beckwith et al. | 359/596 |
| 3,096,684 | 7/1963 | Kegg et al. | 359/595 |
| 3,150,030 | 9/1964 | Mondano | 428/118 |
| 3,351,513 | 11/1967 | Menzer | 359/599 |
| 3,443,860 | 5/1969 | Loboshez | 359/596 |
| 4,078,480 | 3/1978 | Luck | 99/476 |
| 4,262,584 | 4/1981 | Dunbar | 98/55 |
| 4,302,262 | 11/1981 | Kay | 156/71 |
| 4,989,952 | 2/1991 | Edmonds | 359/592 |
| 5,009,152 | 4/1991 | Morgan | 99/476 |

FOREIGN PATENT DOCUMENTS

WO91/19864  12/1991  WIPO.

*Primary Examiner*—David Scherbel
*Assistant Examiner*—Reginald L. Alexander
*Attorney, Agent, or Firm*—Frank J. Dykas

[57] ABSTRACT

The present invention is a sunlight reducing cover for intake and exhaust louvers on a food crop storage building. The invention also decreases the likelihood of ice formation or dirt fouling of the building louvers. The invention interfits within a frame, which is installed over the louvers, preferably inside the building. The invention is generally comprised of a free-flowing, air permeable, plurality of passageways. Each passageway having a first and a second end, with the passageways being of offset configuration wherein the first end is offset from the second end to an extent that a linear path does not exist between the two ends. The preferred embodiment of the present invention is generally comprised of a plurality of panels of generally wave form. The invention is manufactured by attaching the top surface of one panel to the bottom surface of another panel in such a fashion that the period of the wave form of each panel is 180° out of phase with any panel juxtaposed with it, creating a plurality of passageways. In the preferred embodiment of this invention, the panels are made out of an opaque, non-reflective and ultraviolet light resistant polyvinyl chloride.

1 Claim, 11 Drawing Sheets

DAYLIGHT REDUCER FOR FOOD CROP STORAGE BUILDING

BACKGROUND OF THE INVENTION

1. Technical Field

This invention generally relates to food crop storage structures. More particularly, it relates to a sunlight reducing cover for an intake or exhaust louver on a food crop storage building.

2. Background

There are a number of agricultural food products such as potatoes, onions, radishes, carrots, ginger root, artichokes, citrus crops, etc., which are placed into bulk storage after harvest and held from a few months to up to a year prior to processing. In general, the storage environment most suitable for holding these products with a minimum of rot, shrinkage, greening or other losses, is a relatively cool and very controlled environment. For purposes of this disclosure, the potato and potato storage parameters are used as an example, however it should be noted that the problems associated with potato storage environments, and the principals of the present invention, are equally applicable to the storage of onions, carrots, radishes, and other food products requiring a cool and controlled storage environment.

The potato tuber, when harvested from the ground, is a living, respirating organism. The potatoes are dug from the ground and hauled in trucks, in bulk, to a storage facility where they are piled by means of movable conveyor belts, into piles 14 feet to 22 feet high atop of ventilation pipes or ducts. The typical potato storage in use today ranges in size from 9,000 square feet of earthen or concrete floor space to 65,000 feet of earthen or concrete floor space, and will hold between 2,500 tons to 40,000 tons of potatoes. Since these potatoes are living, respirating organisms, there is approximately 2 BTU's per ton of potatoes, per day, of heat generated by the dormant potatoes, or, between 5,000 BTU's to 80,000 BTU's per day of heat generated. Thus, in temperate weather conditions, the problem is not one of keeping the potatoes warm, but rather one of keeping them cool.

In general, there are two means of cooling potatoes in common use today. The first is generally described as the ventilation system, which uses outside ambient air and is suitable for holding potatoes in storage until late spring when the thermal load on the building from the potatoes within and the outside atmosphere increases to the point where a suitable storage environment can no longer be maintained. Where storage is designed to hold potatoes into hot summer months, refrigeration systems are added to the ventilation to provide supplemental cooling.

Figure 1:
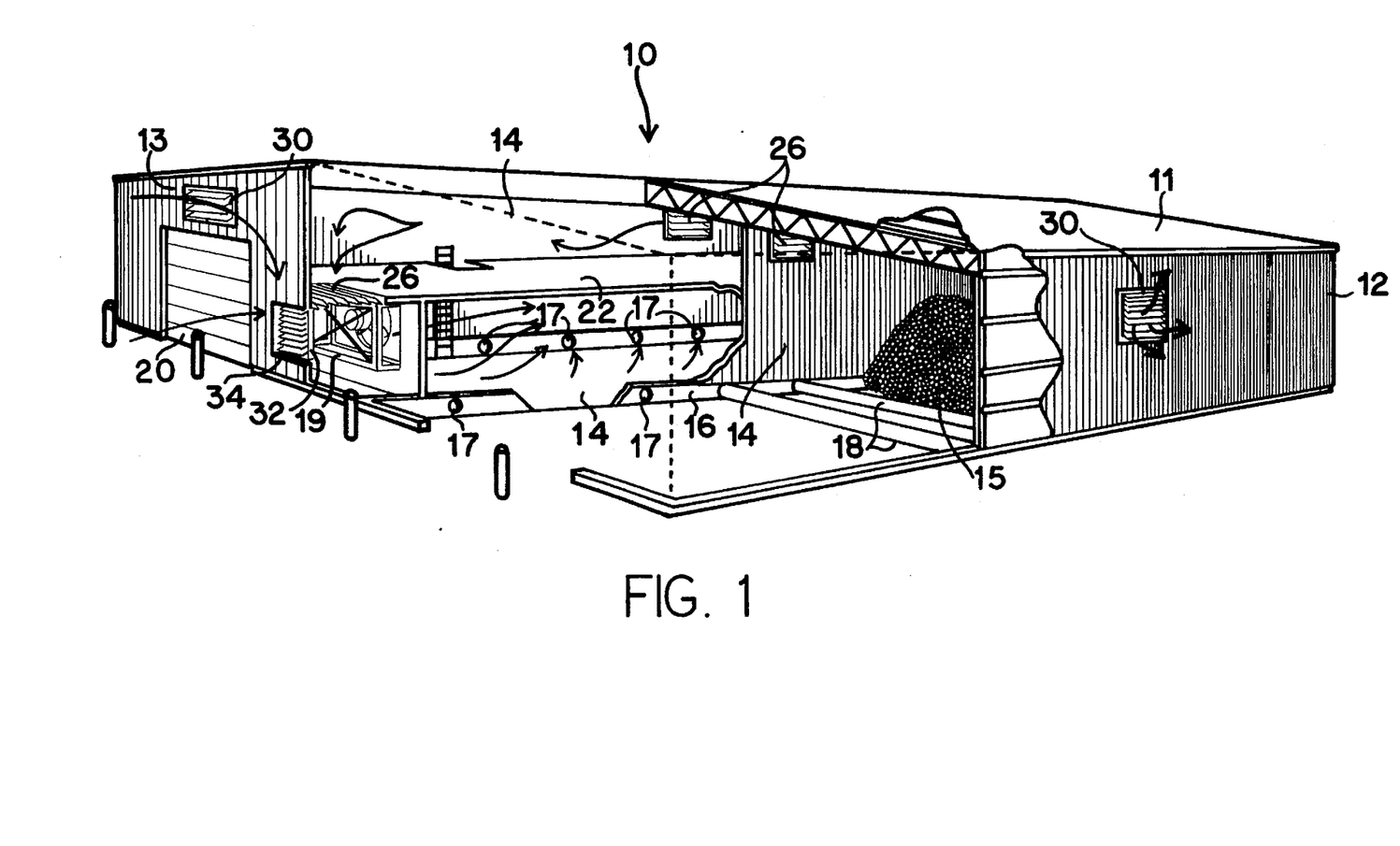
FIG. 1 is a is a perspective partial cutaway representation of a potato storage building having the present invention installed therein.

The prior art ventilation system is similar to that seen in FIG. 1. It includes a primary air recirculation system wherein cool humid air is blown into ventilation ducts positioned at the bottom of the potato pile. Air coming in through the ventilation ducts is distributed through vent holes in the pipes and flows up through the pile of potatoes into a return air plenum, or it is discharged directly to the outside atmosphere through exhaust louvers. The return air louver is a recirculation louver which returns the air to the ventilation fans in the supply air plenum. The return air louver controls the amount of air which flows out the exhaust louver to the outside atmosphere.

Also provided is an outside air intake louver which is used to supply cool, fresh air to the ventilation fans. A control system is provided which monitors the discharge air temperature supply to the potato pile in the supply air plenum and a second sensor monitors outside air temperature. Thus, in relatively moderate temperature conditions when the outside air temperature is below the desired storage temperature, the outside air louver is opened, either partially or fully, to provide a mixture of cool outside air with warmer inside air in the return air plenum, to provide potatoes with desired air temperature and control temperature within the storage. For longer term storage, refrigeration systems are provided to cool the return air and the outside air intake louvers are closed.

It is important that the intake and exhaust louvers be activated simultaneously, or at least coordinated to prevent over pressure or excessive thermal loss. This is usually accomplished by a relatively complex control system between the intake and exhaust louvers.

As a result of this complex control system, the intake and exhaust louvers can be opened for cycles lasting from as long as 12 to 24 hours. These long cycles when the louvers are opened for extended periods of time, allow for significant amounts of visible light to infiltrate the storage building. Light infiltration into the storage building is an undesirable consequence of the requisite open cycles of the intake and exhaust louvers. As a result of exposure to visible light, a green color appears in the area immediately beneath the skin of a potato. This phenomena is generally referred to as potato greening.

The greening is the manifestation of chlorophyll formation by the potato tuber in response to the exposure to visible light. When potatoes are in storage, the primary source of exposure to light is through the intake and exhaust louvers during the cycles designed to control the temperature of the storage building. The economic importance of potato greening lies in the lack of marketability of such potatoes, in part due to the association of greened potatoes with bitter taste and to the suspicion of poisonous substances being present. The best method for preventing greening is to keep the potatoes away from visible light.

In order to reduce the amount of visible light that infiltrates the storage building, hoods are installed on the exterior of the building over the intake and exhaust louvers. The hoods provide a shaded area over the intake and exhaust louvers to decrease the amount of visible light that infiltrates the storage building. Although the hoods reduce the amount of visible light that infiltrates the building, there are both management problems associated with the use of shade hoods and inherent design problems with the hoods.

The first problem involves ice formation associated with the use of shade hoods. The exhaust air leaving the building is at an approximate 90% relative humidity, in cool weather this places the dew point and the ambient temperature of the air leaving the storage building in very close range. Because of the shade provided by the hood, these conditions allow ice to form inside the hood during cool weather. This ice formation interferes with the functioning of the louvers and prevents the intake and exhaust louvers from functioning in concert to provide the controlled environment necessary in the food crop storage building.

Another problem with using shade hoods over the louvers is dirt build up. During rainy weather, the hood provides an environment where eddy currents of air bring dust and wet condensate in contact with each other, creating a dirt and mud problem in the area of the louvers. The dirt and mud build up can be significant, often to the extent of fouling the louvers and, again, disrupting control of the potato storage environment.

The size of the hoods also can be a problem. In certain geographical regions, large hoods are susceptible to wind damage. Gusts of wind cause movement inside the hoods, which increases over time. The wind-generated movement inside the hoods can result in stress fractures and ultimately in structural failure of the shade hoods.

The problems of ice formation and dirt fouling associated with the use of shade hoods is compounded by the fact that, frequently, food crop storage buildings are remotely located and consequently are checked infrequently. As a result of the remote locations, the potatoes can be housed in the storage units for extended periods of time without discovery of any problem. It is, therefore, important to have a system with a high degree of reliability that reduces the amount of light infiltration and allows proper louver function.

A useful shade hood must be of a reasonably large dimension in order to shade the louvers on the food crop storage buildings. An inherent disadvantage of the large dimensions of the shade hood is that an undesirable amount of visible light is still able to enter the building through the louvers because light is able to impinge on the hood and reflect back at the building and through the louvers.

What is still needed is a means for reducing potato tuber exposure to visible light when the intake or exhaust louvers are open. It is, therefore, an object of the present invention to provide a means for reducing visible light infiltration into a food crop storage building, and thereby reduce the amount of greening in potato tubers and the associated economic loss.

It is an additional object of the present invention to provide a sunlight reducing cover for intake and exhaust louvers on a food crop storage building that reduces the amount of reflected light that is able to infiltrate the building.

It is a further object of the present invention to provide a sunlight reducing cover for the intake and exhaust louvers on the food crop storage building that decreases the likelihood of ice formations or dirt fouling of the intake and exhaust louvers.

DISCLOSURE OF INVENTION

The present invention is a sunlight reducing cover for intake and exhaust louvers on a food crop storage building. The invention reduces the amount of light which is able to infiltrate the building when the louvers are open. As a result of exposure to visible light a green color can appear in the area immediately beneath the skin of the potatoes in storage. The economic importance of potato greening lies in the lack of marketability of such potatoes. The best method for preventing greening and the associated economic loss is to keep the potatoes in storage away from visible light. The present invention reduces potato greening during storage by decreasing visible light transmission into the storage building. The present invention also decreases the likelihood of ice formation or dirt fouling of the intake and exhaust louvers on a food crop storage building.

The sunlight reducing cover is sized and shaped to closely interfit within a frame, which is installed over the exhaust or intake louver, preferably inside the food crop storage building.

The sunlight reducer is generally comprised of a free-flowing, air permeable, plurality of passageways. Each passageway having a first and a second end, with the passageways being of offset configuration wherein the first end is offset from the second end to an extent that a linear path does not exist between the first and second end. The sunlight reducing cover of the present invention is fabricated out of a non-reflective and opaque material.

In the preferred embodiment of the present invention the sunlight reducer is generally comprised of a plurality of panels. Each panel possesses a top surface and a bottom surface, and is of a generally wave form.

The sunlight reducer is manufactured by attaching a plurality of panels, in series, side by side. The panels are laminated in such a fashion that the period of the wave form of each panel is 180° out of phase with any panel juxtaposed with it. For example, the peak of any wave in the first panel will be directly in line with the trough of any wave in an adjacent panel, forming an air passageway. In the preferred embodiment of this invention the panels are made out of a non-reflective and ultraviolet light resistant polyvinyl chloride.

A non-obvious result of the present invention is that a shade hood is no longer required on the food crop storage building. The general design of the shade hoods results in a propensity for ice formation and dirt fouling around the intake and exhaust louvers of the food crop storage building. The storage buildings are often remotely located and consequently are checked infrequently. By eliminating the need for a shade hood, several problem sources in the storage system are eliminated. As a result of the use of this invention, the storage system used for potatoes becomes more reliable and more economical.

BEST MODE FOR CARRYING OUT INVENTION

For purposes of this disclosure, the potato and potato storage parameters are used as an example, however it should be noted that the problems associated with potato storage environments, and the principals of the present invention, are equally applicable to the storage of onions, carrots, radishes, and other food products requiring a cool and controlled storage environment.

A potato storage building 10 is shown and described in FIG. 1. Storage building 10 is here a metal building having a roof 11 supported by side walls 12 and end walls 13. The front end wall 13 is provided with large access doors through which the crop is loaded and unloaded. Conveniently, all of the environment control apparatus for the building is located either on, in or near front end wall 13.

Two parallel storage bays are separated by central air plenum, generally designated as 14. Potatoes 15 are piled in the storage bays usually to a height of between fourteen to twenty-two feet. In order to keep these potatoes cooled to the desired storage temperature, air is ducted from the air supply plenum through holes 17 in concrete footing 16 into ventilation ducts 18 out through ventilation duct holes (not shown) into the bottom of the pile of potatoes 15, the air then flows up through the pile and thereby cooling them.

Air flowing up from the top of potato pile 15 passes either back into the air circulation system through recirculation louver 26, or is exhausted to outside atmosphere through exhaust louver 30, depending upon outside air temperature and the temperature of the stored potatoes relative to the desired set point temperature. Ventilation fans 19 and humidifiers are provided to drive humidified air throughout the circulation system.

For example, if the desired storage temperature is 48° F., and the exhaust air flowing up through potato pile 33 is at 50° F., and outside air temperature is at 46° F., then some of the air rising from potato pile 33 will pass into the return air mixing chamber through return air louver 26, where it will be mixed with the cooler outside air drawn in through fresh air louver 28 to provide a supply air having a temperature of 47° F. The rest of it will pass through open exhaust louver 30 to the outside atmosphere.

Figure 2:
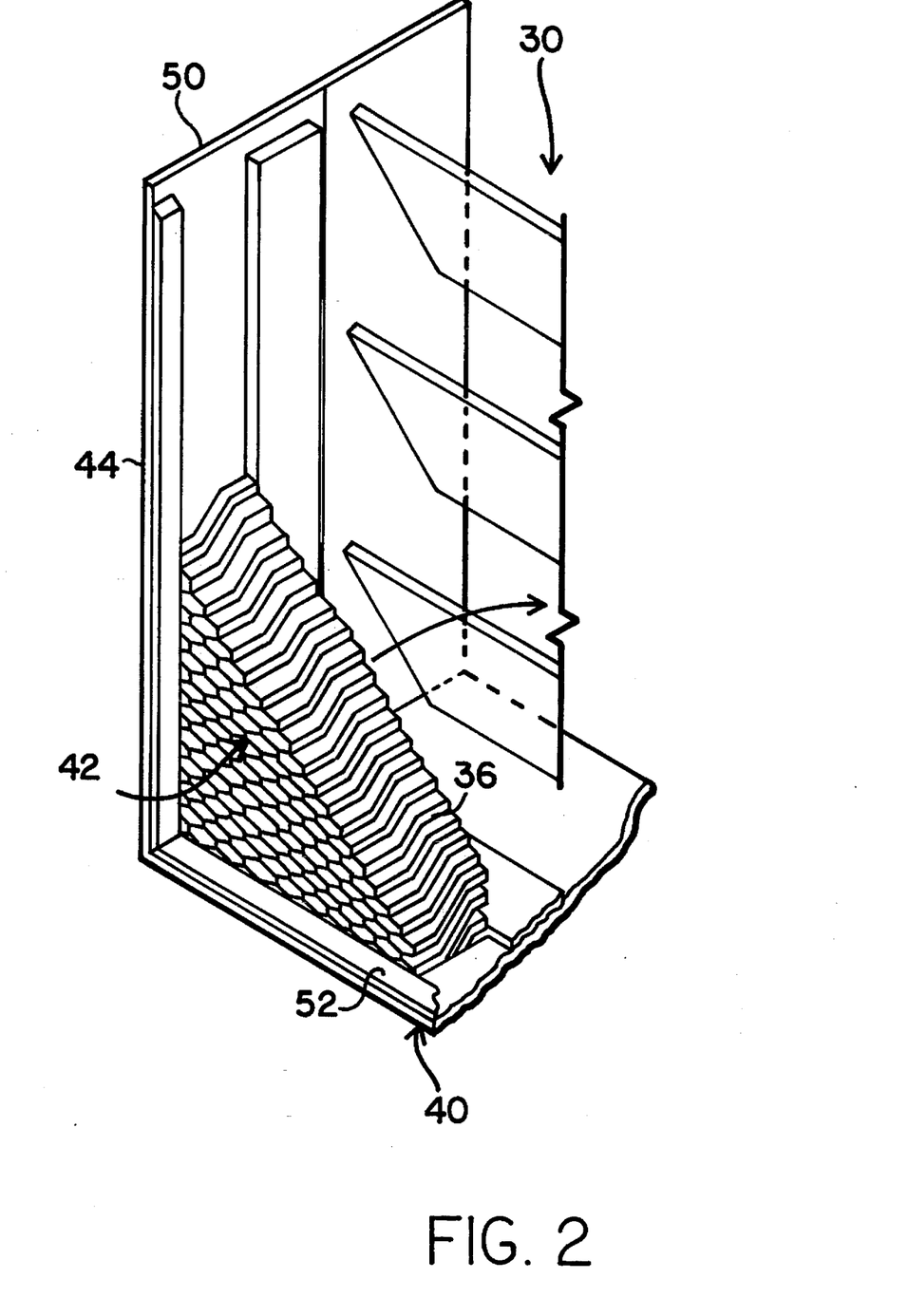
FIG. 2 is a partial cutaway representational view showing the installation of the invention.

Referring now specifically to FIGS. 1 through 10, sunlight reducer 32 is shown and will be described in detail. Sunlight reducer 32 is sized and shaped to closely interfit within frame 50 which is then installed over exhaust louver 30 or intake louver 34, as shown in FIGS. 1 and 2.

Figure 3:
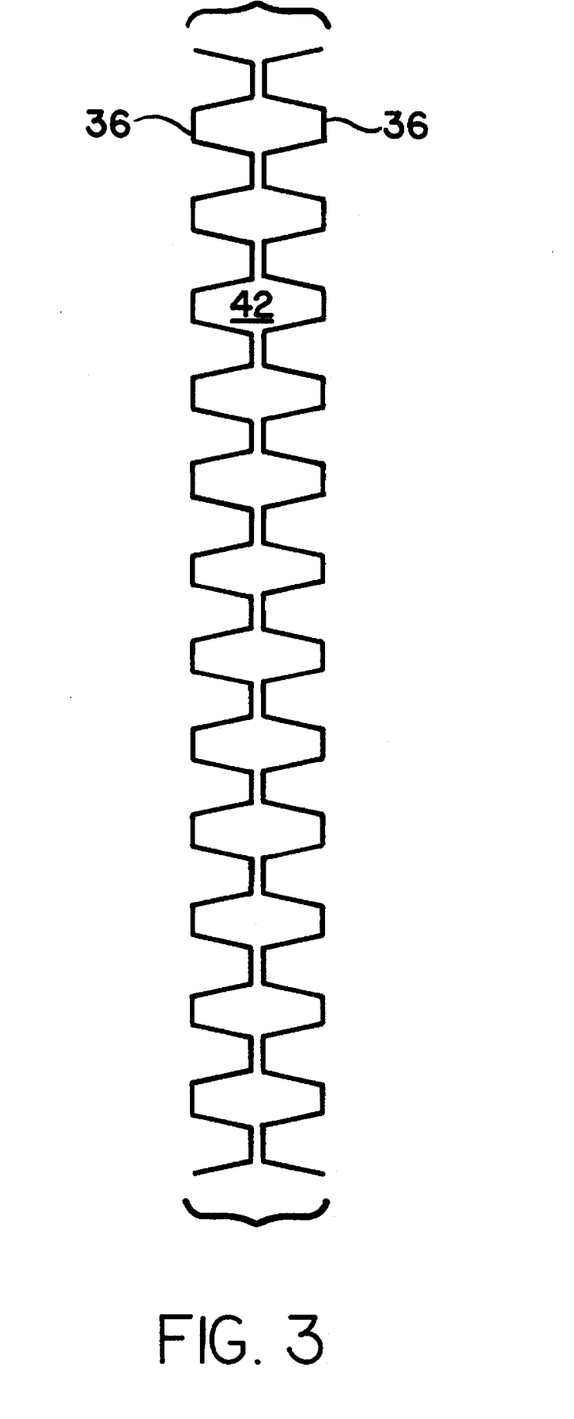
FIG. 3 is a front view detail showing the wave form panels joined to form a passageway.

The preferred embodiment sunlight reducer 32 is generally comprised of a plurality of panels 36. Each sunlight reducer 32 possesses top surface 38 and bottom surface 40. Each panel 36 is generally of a wave form. Sunlight reducer 32 is here manufactured by attaching a plurality of panels 36 in series attached to bottom surface 40 of another unit of panel 36 in such a fashion that the period of the wave form of each panel 36 is 180° out of phase with any panel 36 juxtaposed with it, as shown in FIG. 3. For example, the peak of any wave in the first panel 36 will be directly in line with the trough of any wave in an adjacent panel 36, forming air passageway 42, as shown in FIG. 3.

Figure 5:
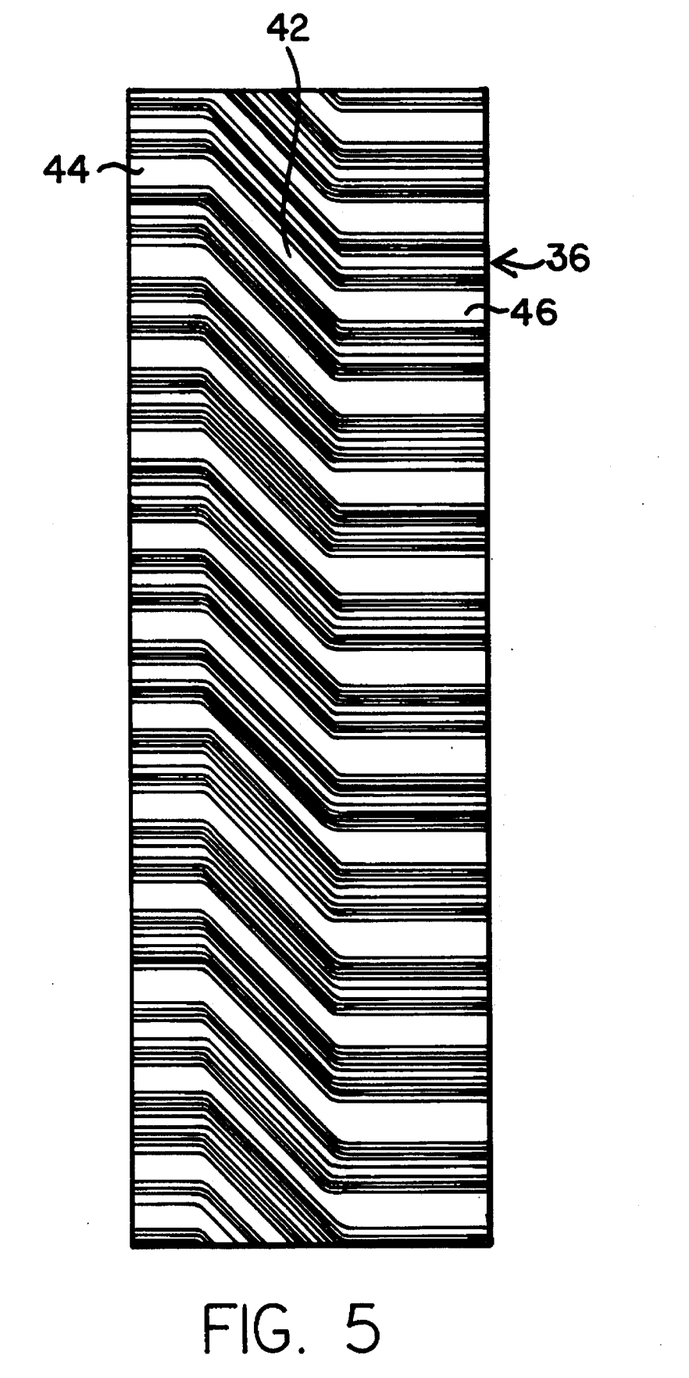
FIG. 5 is a first side view of the preferred embodiment of the present invention.
Figure 6:
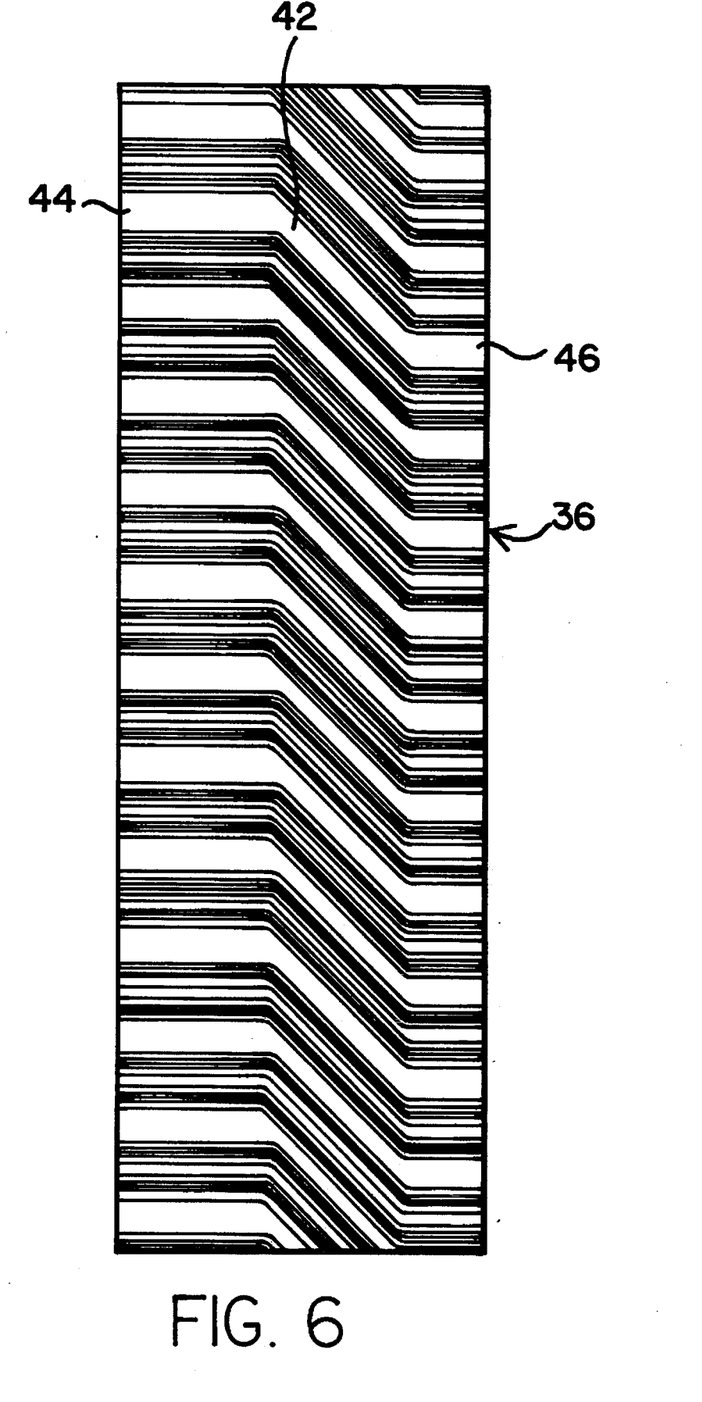
FIG. 6 is a second side view of the preferred embodiment of the present invention.

In the preferred embodiment of this invention, comprising sunlight reducer 32, the plurality of panels 36 are made out of a non-reflective and ultraviolet light resistant polyvinyl chloride. As shown in FIGS. 5 and 6 passage way 42 has first end 44 and second end 46. Passageway 42 possesses a plurality of bends, here two, such that first end 44 is offset from second end 46 to an extent that a linear path does not exist between first end 44 and second end 46, as seen in FIGS. 5, 6 and 7.

The preferred embodiment of this invention has just been described, but other embodiments of this invention can also be used to accomplish the same purpose. Other embodiments include virtually any shape which allows the free flow of air through passageway 42 and also completely offsets first end 44 and second end 46 because such shapes will greatly reduce the amount of light that can infiltrate food crop storage building 10. For example, a complete circle or loop along passageway 42 would offset the ends, allow the free flow of air and function to reduce the amount of visible light that infiltrates building 10. Another possible embodiment is comprised of a plurality of turns in passageway 42, with those turns going in different directions and being in different planes. Any configuration which can be generally described as tortuous or convoluted while allowing the free flow of air would prevent the direct transmission of light and decrease the amount of reflected light passing through passageway 42. Such convoluted configurations also represent other embodiments.

Figure 4:
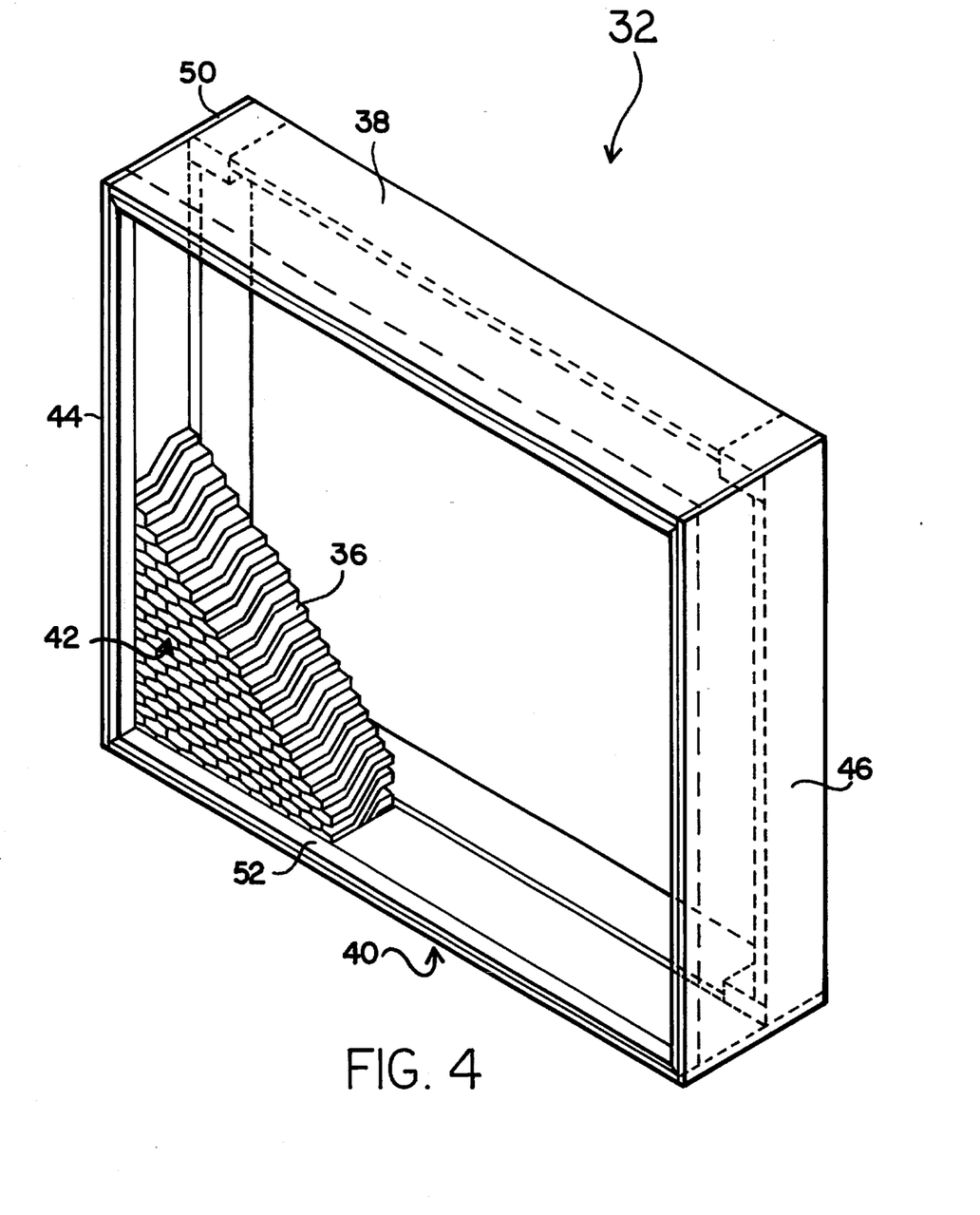
FIG. 4 is an isometric view showing the invention fitted in a frame.
Figure 8:
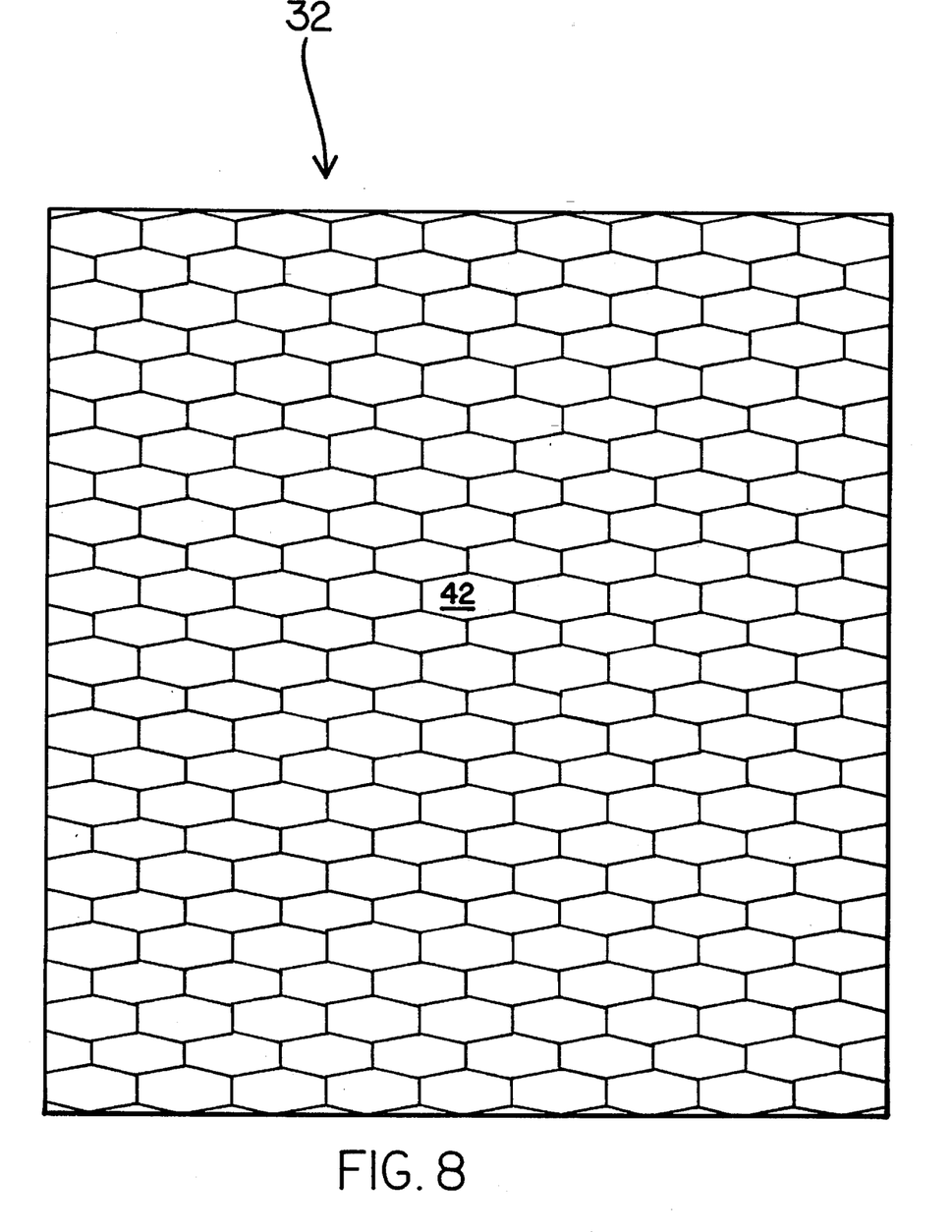
FIG. 8 is a front view of the preferred embodiment of the present invention.
Figure 9:
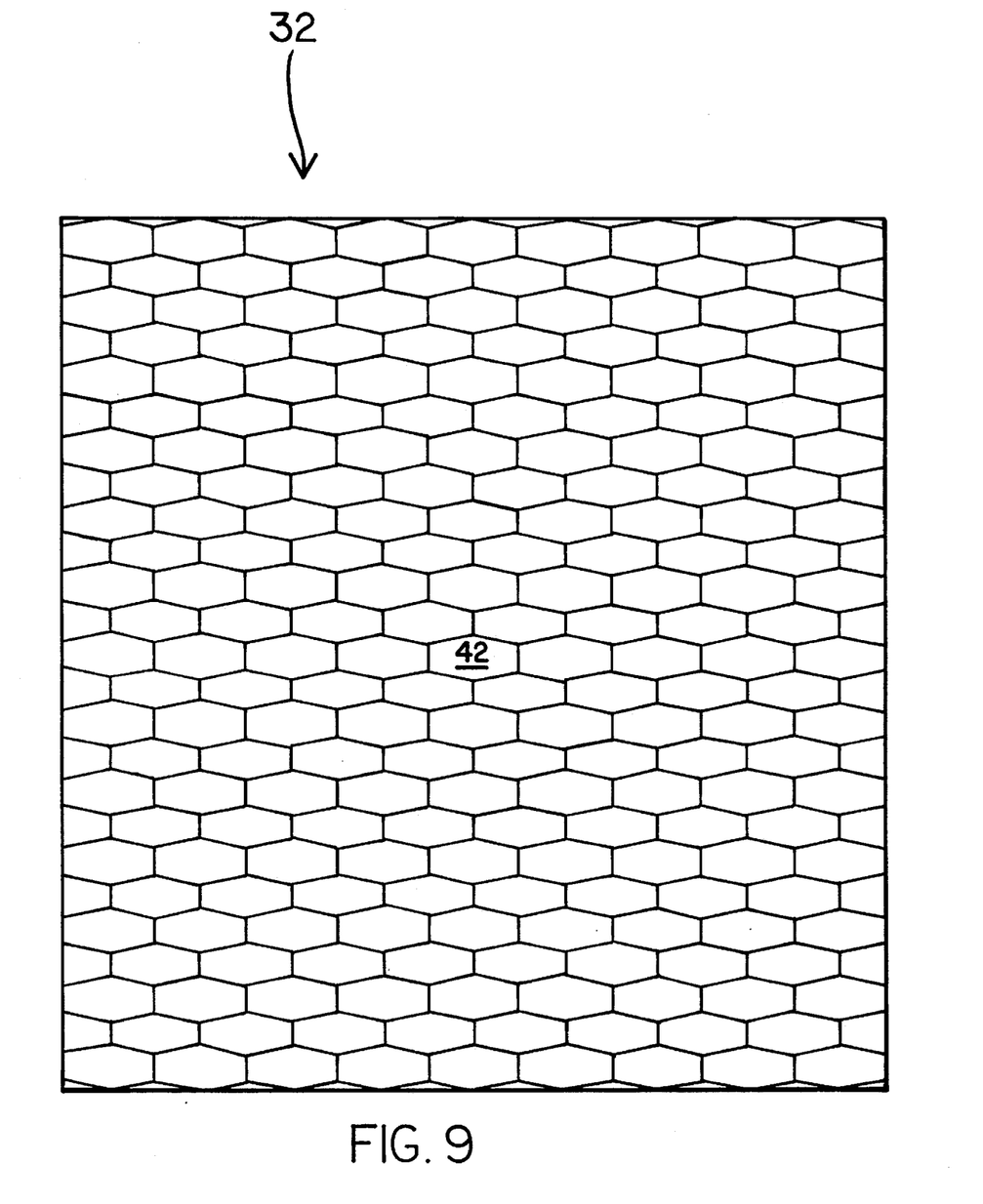
FIG. 9 is a back view of the preferred embodiment of the present invention.
Figure 10:
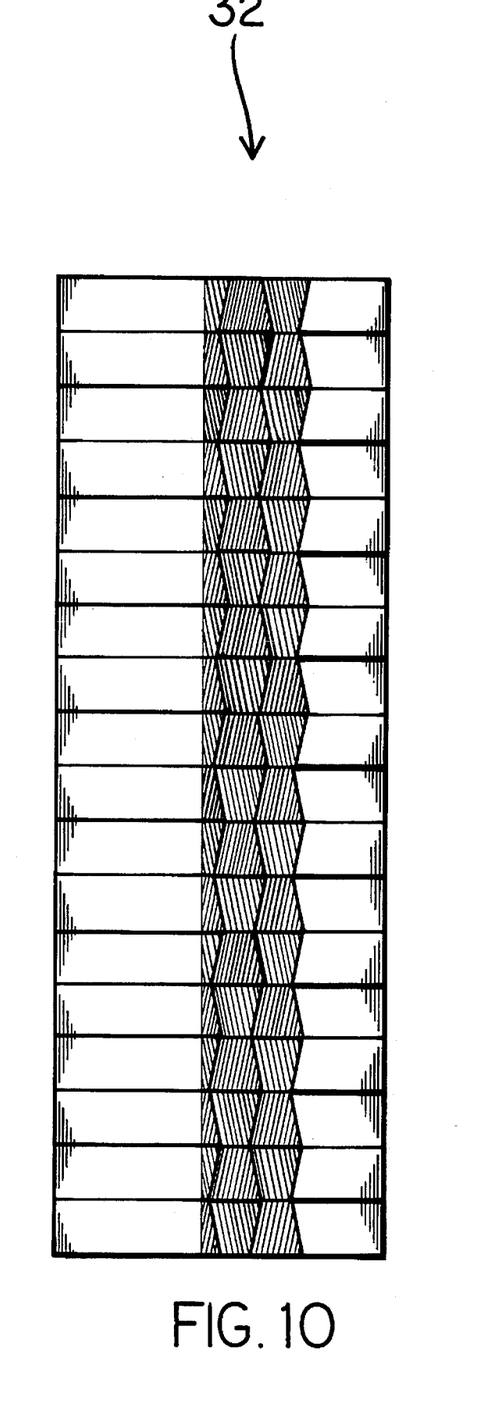
FIG. 10 is a top view of the preferred embodiment of the present invention.
Figure 11:
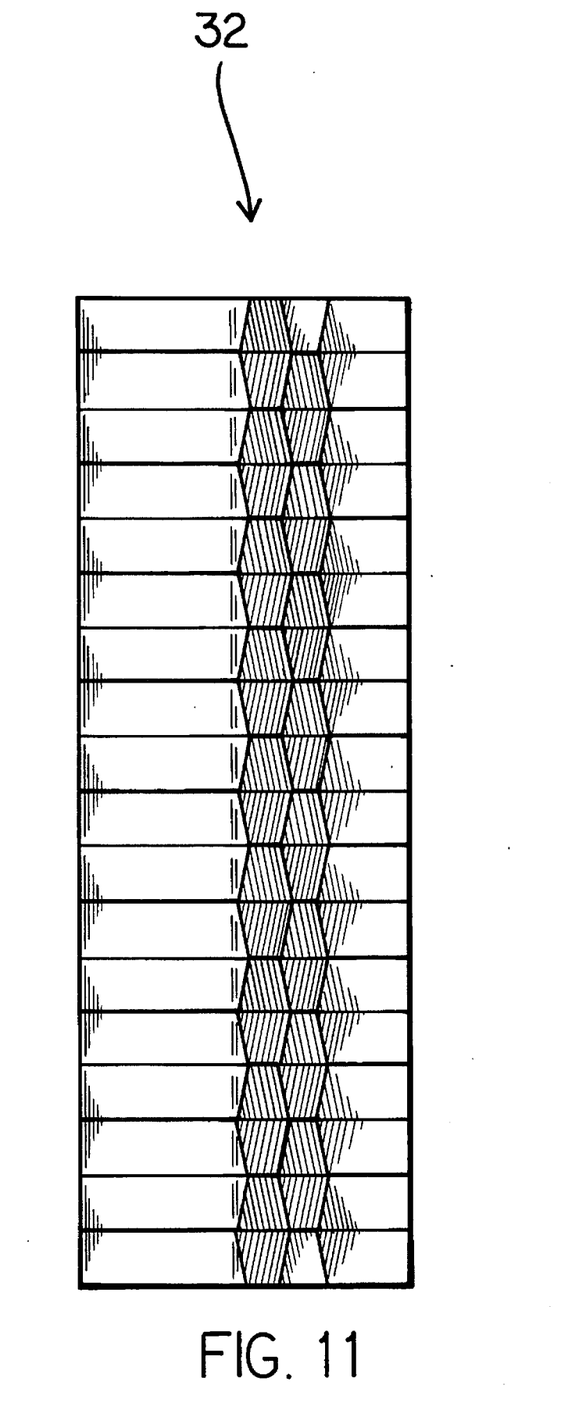
FIG. 11 is a bottom view of the preferred embodiment of the present invention.

In use, sunlight reducer 32 is manufactured by laminating a series of panels 36 together, using any appropriate securing means including adhesives, in such a fashion that the period of the wave form of each panel 36 is 180° out of phase with any panel 36 laminated to it, creating passageway 42, as seen in FIGS. 3, 8 and 9. Sunlight reducer 32 is then installed in frame 50, here made out of wood, and retaining strip 52 is fitted into frame 50 to secure sunlight reducer 32 in place, as shown in FIGS. 2 and 4. In the preferred embodiment of this invention, frame 50 containing sunlight reducer 32 is then installed inside food crop storage building 10, over exhaust louver 30 or intake louver 34, as shown in FIGS. 1 and 2. It should be noted that sunlight reducer 32 can also be installed on the outside of building 10.

Figure 7:
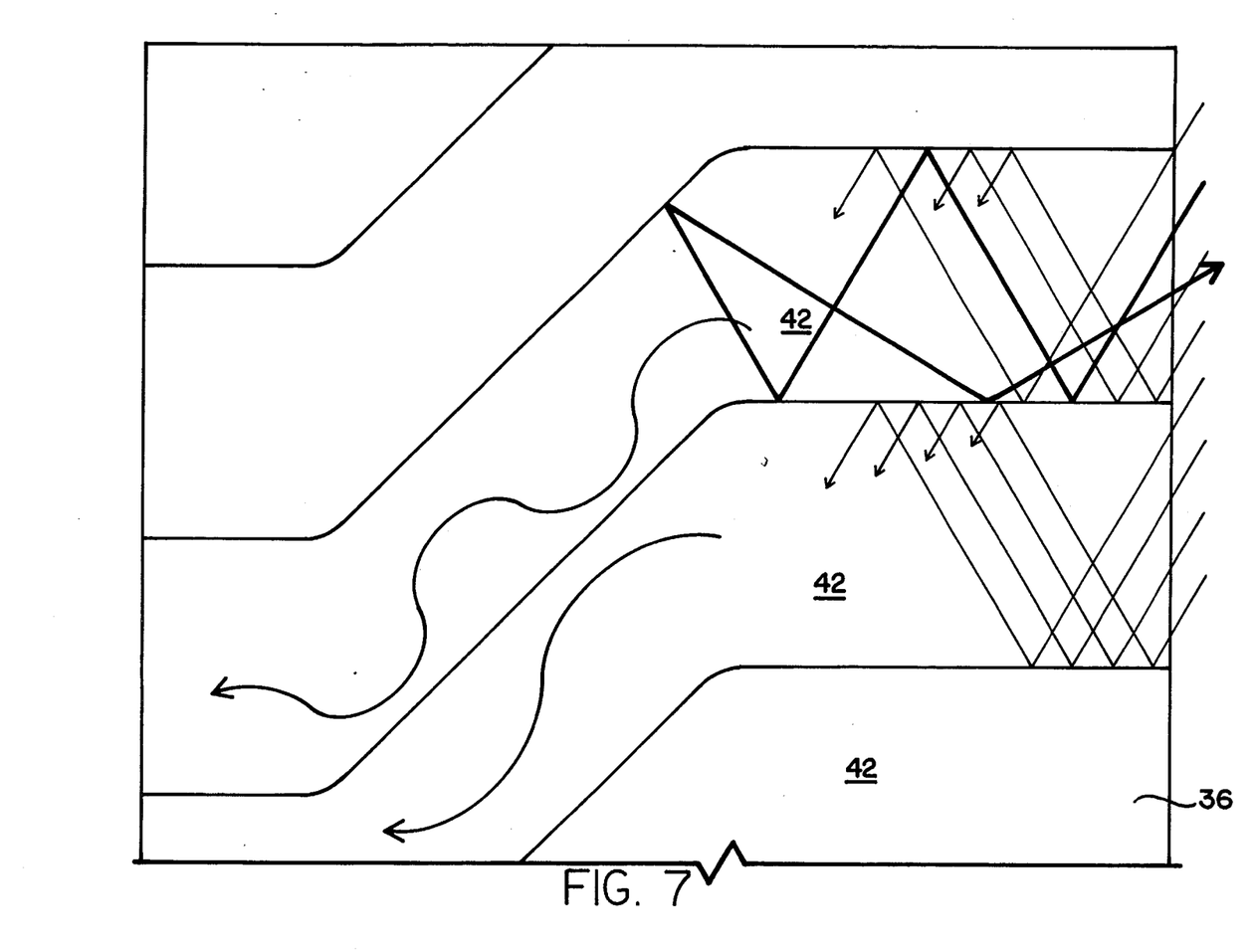
FIG. 7 is a schematic representational view showing behavior of rays of light entering the invention.

In the preferred embodiment of this invention sunlight reducer 32 reduces the levels of visible light entering food crop storage building 10 in two primary ways, as schematically shown in FIG. 7. Firstly, the offset configuration of first end 44 and second end 46 of passageway 42 will prevent most of the light from direct transmission into building 10. Secondly the non-reflective material used in the manufacture of sunlight reducer 32 will prevent the indirect transmission of light into building 10.

The prevention of direct transmission of light is a function of the behavior of light when it interacts with matter. When light interacts with matter it behaves as if the light is composed of particles rather than being a wave form. Direct light that falls on a surface is called incident light and the angle formed by a ray of light arriving at a surface is called the angle of incidence. With the offset configuration of first end 44 and second end 46 of passageway 42 a linear path does not exist between ends 44 and 46. Thus a ray of light cannot pass directly through passageway 42 and only reflected light can be transmitted through passageway 42. The angle of reflection of light is equal to the angle of incidence. The completely offset configuration of ends 44 and 46 of passageway 42 reduce the amount of light that will be transmitted into first end 44 of passageway 42 with an angle of incidence that would result in the light being reflected out of second end 46 of passageway 42, as shown in FIG. 7.

The prevention of indirect transmission of light through passageway 42 is also related the behavior of light interacting with matter. Total reflection occurs at a highly polished surface of an opaque material, such as metal. If the reflecting material is rough, with irregularities on a scale comparable to or larger than the wavelength of light, then reflection occurs in all directions. This multi-directional reflection is called diffuse reflection. In the preferred embodiment of this invention sunlight reducer 32 in made from a non-reflective polyvinyl chloride. The polyvinyl chloride in non-reflective because its surface is rough with irregularities. These qualities of the polyvinyl chloride cause light entering passageway 42 to be reflected diffusely, that is in all directions, which results in less reflected light being transmitted through passageway 42.

While there is shown and described the present preferred embodiment of the invention, it is to be distinctly understood that this invention is not limited thereto but may be variously embodied to practice within the scope of the following claims.

I claim:

1. A free-flowing air permeable sunlight reducer for agricultural food product storage buildings comprising:

a form constructed from a plurality of panels, each panel being substantially of a wave form;

each panel being permanently attached to an adjacent panel such that any two panels are juxtaposed such that the period of their wave forms are 180° out of phase with each other, thereby forming a rigid structure having a plurality of passageways;

each passageway having a first and a second end, the passageways being of offset configuration wherein the first end is offset from the second end to an extent that a linear path does not exist between the first and second end; and the panels are fabricated out of a non-reflective and opaque ultraviolet light-resistant polyvinyl chloride.

* * * * *